Patented Mar. 28, 1939

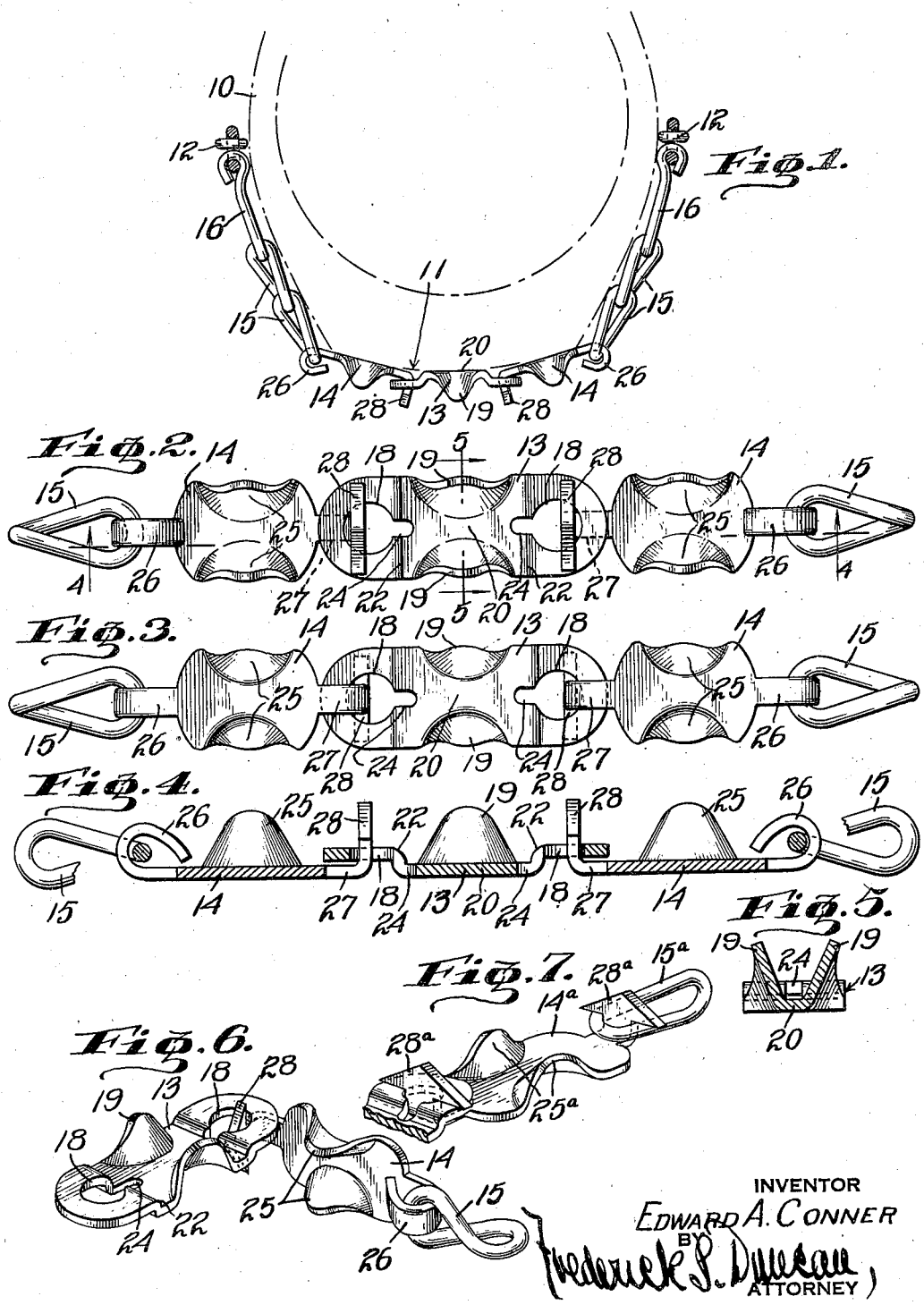

2,151,900

UNITED STATES PATENT OFFICE 2,151,900

CROSS-CHAIN FOR TIRE CHAIN ASSEMBLIES

Edward A. Conner, Stratford, Conn., assignor to American Chain & Cable Company, Inc., a corporation of New York Application November 16, 1936, Serial No. 111,006

6 Claims. (Cl. 152—244)

The present invention relates to anti-skid tire chain assemblies and more particularly to cross-chains in such assemblies. The invention has for an object to provide a new form of link for cross-chains which will provide good traction on icy pavements and will also prevent skidding.

A more specific object of the invention is to provide cross-chain links formed of sheet metal with outstanding prongs disposed transversely to the plane of rotation of the wheel so as to increase traction and other prongs disposed substantially parallel to said plane of rotation so as to prevent skidding.

A further object of the invention is to provide links of such form that certain of the prongs may be used to connect the links to one another.

A still further object of the invention is to provide a cross-chain with links which may be readily connected and disconnected so that in case of damage a link may be removed and replaced by another.

Other objects and advantages of my invention will appear in the following description of a preferred embodiment and a modification thereof and thereafter the novelty and scope of the invention will be set forth in the claims.

In the accompanying drawing:

Figure 1 is a cross-sectional view of a vehicle tire with my improved tire chain applied thereto;

Fig. 2 is a fragmental plan view of my improved cross-chain showing the outer face of certain sheet metal links incorporated in the chain;

Fig. 3 is a similar plan view showing the inner face of said cross-chain links;

Fig. 4 is a view in longitudinal section taken substantially on the line 4—4 of Fig. 2;

Fig. 5 is a view in cross-section taken on the line 5—5 of Fig. 2;

Fig. 6 is a view in perspective showing how my improved links may be connected or disconnected; and, Fig. 7 is a view in perspective showing a modified form of sheet metal link connected to a wire curb link.

Referring to Figure 1, I show in section a portion of a vehicle tire 10 having a tread surface 11. On this tire is shown a portion of a tire chain assembly consisting of a pair of side chains 12 connected by a cross-chain. That portion of the cross-chain which lies against the tread 11 consists of three links formed of sheet metal. One of these links 13 is centrally disposed and differs in construction from the other two links 14 disposed respectively at opposite sides thereof. The links 14 are connected to wire links 15 preferably of the usual curb type and the curb links in turn are connected to the side chains 12 by connecting hooks 16 which may be of any desired form.

The central link 13 is stamped out of a flat sheet of metal and is formed with an aperture 18 near each end thereof. At a median point on each side of the link is a road-engaging projection 19, each projection being bent outwardly or away from the base plane of the link. In bending these projections part of the base metal is stretched so as to give each projection a substantially semi-conical or scoop shape, incidentally, forming a constricted waist 20 in the base, as shown in Fig. 3. The semi-conical shape of the projections renders them very strong so that they cannot be flattened in service. The projections also flare apart, as shown in Fig. 5, for a purpose which will be explained hereinafter. The apertured ends of the link are off-set or stepped as shown at 22, in Fig. 4, so that they may overlie the adjacent sheet metal links 14. Each aperture 18 is in the shape of a keyhole with a large round opening and a narrow extension slot 24 on the longitudinal axis of the link, such slot cutting through the step 22.

The links 14 are also stamped out of sheet metal and are formed with a projection 25 at each side bent outwardly from the base of the link. These projections are similar in shape to the projections 19. The link 14 is formed at each end with a tongue. The tongue 26 at one end is bent outwardly into the form of a hook which may be looped through an adjacent curb link 15, the bight of the hook being then closed to make a permanent connection with the curb link. The other tongue 27 is bent outwardly at right angles at a point spaced from the main body of the link, so that it may pass through the aperture 18 of the link 13. The extremity of this tongue 27 is headed, being formed with a laterally projecting wing or barb at each side, giving it substantially the form of an arrowhead 28 which is disposed in a plane substantially normal to the longitudinal axis of the link 14.

The method of inserting the barbed tongue 27 into the aperture 18 is illustrated in Fig. 6. The link 14 must be disposed with its axis substantially normal to the axis of the link 13 and with its plane also substantially normal to the plane of the link 13. One wing of the arrowhead is then inserted from the inner side into the aperture 18 and the link 14 is then swung into parallel with the plane of the link 13, thereby causing the other wing of the arrowhead to pass through the extension slot 24. Thereafter, the two links may be swung into axial alinement. It will be noted that the aperture 18 with its extension 24 is of less extent than the width of the arrowhead so that the arrowhead cannot be passed through the aperture without disposing the links at right angles to each other and then causing a relative angular movement of the links as illustrated in Fig. 6. There will be no danger of having the links come apart while the tire chain is on the tire because the links cannot be relatively moved sufficiently to cause disengagement of the parts.

The width of the extension slot 24 is only slightly greater than the thickness of the material from which the link 14 is made. If desired, after the links have been assembled, as explained above, the apertured ends of the center link may be laterally compressed to pinch the extension slot or the metal may be peened over at one or both sides of this extension slot so that the links cannot accidentally come apart when the chain is off the tire.

In service there is always a tendency for the links on the tread of the tire to roll in one direction or the other. That is, the resistance of the road to the traction of the wheel will cause rolling in one direction and if the wheel is sharply braked the forces will be reversed and the link will tend to roll in the opposite direction. This rolling is resisted by the form of the link which provides a broad base bearing on the tire tread, and also by the flare of the projections which broadens the bearing on the road and causes one or the other of the side projections 19 and 25 to project farther outwardly when the link is rolled. The rolling effect on each link is further resisted by the adjacent sheet metal links and also by the connections to the curb links 15.

It will be observed that the barbed projections 28 project fully as far as do the side projections 19 and 25 and the barbed projections serve to prevent lateral sliding of the tire, particularly as each arrowhead is formed with a sharp point. The arrowheads thus serve the double purpose of preventing skidding and connecting the links one to another.

In Fig. 7, I show a slight modification of an outer sheet metal link. This link 14a differs from the link 14 only in being formed with a barbed projection 28a at each end. The projection 28a at the outer end of the link may be hooked into a curb link 15a, as shown, dispensing with the necessity of using a hook for this connection. In other words, the links 14a are reversible. In order to prevent the accidental disconnection of this link from the curb link, the latter is preferably pinched intermediate its ends after the arrowhead has been introduced therethrough. Due to the twisted form of this curb link it does not require much lateral compression to distort the link to such an extent that the arrowhead cannot accidentally be unhooked therefrom. The form of link shown in Fig. 7 is of advantage not only in that it provides a reversible link but also in that it provides an additional transversely disposed projection to prevent skidding. It will be understood that the pinching of the slots 24 and of the curb links may be only sufficient to prevent accidental disengagement of the parts without preventing one from forcibly disengaging the links when desired, so that in case of damage to any link it may readily be replaced with a fresh link.

While I have described a preferred embodiment of my invention and a modification thereof it will be understood that these are to be taken as illustrative and not limitative and that I reserve the right to make various changes in form, construction and arrangement of parts without departing from the spirit and scope of my invention as set forth in the following claims.

I claim:

1. A cross-chain for anti-skid tire chains including a link comprising an elongated base provided at its ends with means for making connection with adjacent links and also provided with scoop-shaped road-engaging projections, the concave surfaces of which face in opposite directions and away from each other and transversely of the cross-chain.

2. A cross-chain for anti-skid tire chains including a link comprising an elongated base provided at its ends with means for making connection with adjacent links and also provided with outwardly flaring scoop-shaped road-engaging projections, the concave surfaces of which face in opposite directions and away from each other and transversely of the cross-chain.

3. A cross-chain for anti-skid tire chains including a link provided at its ends with means for connecting the same to adjacent links and at its sides with scoop-shaped road engaging projections, the concave surfaces of which face in opposite directions and away from each other and transversely of the cross-chain, the bases of said projections being spaced and located inwardly of the side edges of the link.

4. A cross-chain for anti-skid tire chains including a link provided at its ends with means for connecting the same to adjacent links and at its sides with scoop-shaped road engaging projections, the concave surfaces of which face in opposite directions and away from each other and transversely of the cross chain, the bases of said projections being spaced and located inwardly of the side edges of the link, and the projecting points of said scoop-shaped projections being located substantially radially outwardly of the side edges of the link.

5. A cross-chain for anti-skid tire chains including a central tread link provided at its ends with apertures to receive link connectors, laterally adjacently disposed links provided with connector heads adapted to be positioned in said apertures of the central link and constituting when the chain is on a tire laterally flaring anti-skid lugs, and road engaging projections on the sides of said link flaring downwardly and outwardly in the direction of the circumference of a tire on which the chain is used.

6. A cross-chain for anti-skid tire chains including a link provided at its ends with means for connecting the same with adjacent links and on its side edges with outwardly diverging road engaging projections, said projections being scoop-shaped and facing toward the respective side edges of said link.

EDWARD A. CONNER.